May 6, 1958  R. A. COCHRANE  2,833,560
ROCK LOCK TYPE COUPLER FOR TRACTOR-TRAILER
FIFTH WHEEL LOCKING MECHANISM
Filed Dec. 23, 1955  2 Sheets-Sheet 1
Fig. 1
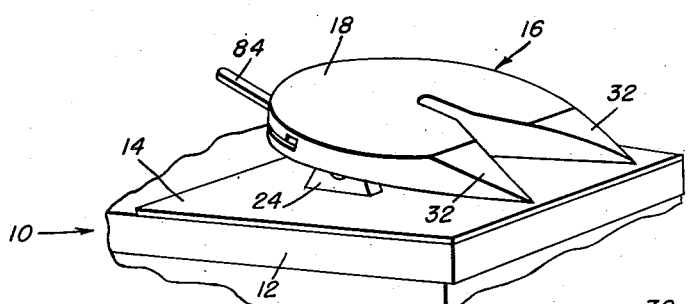
Fig. 2
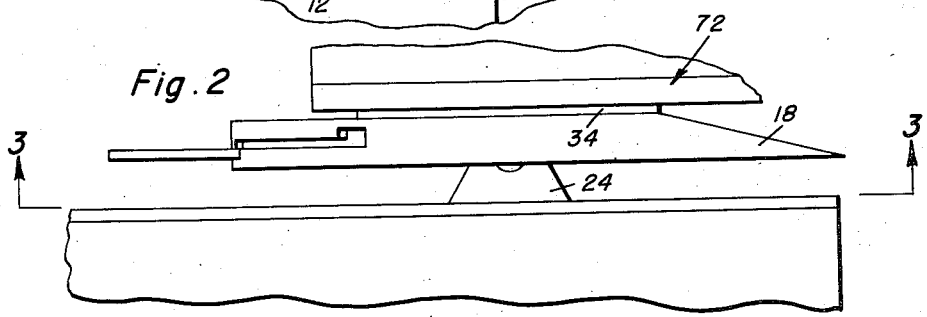
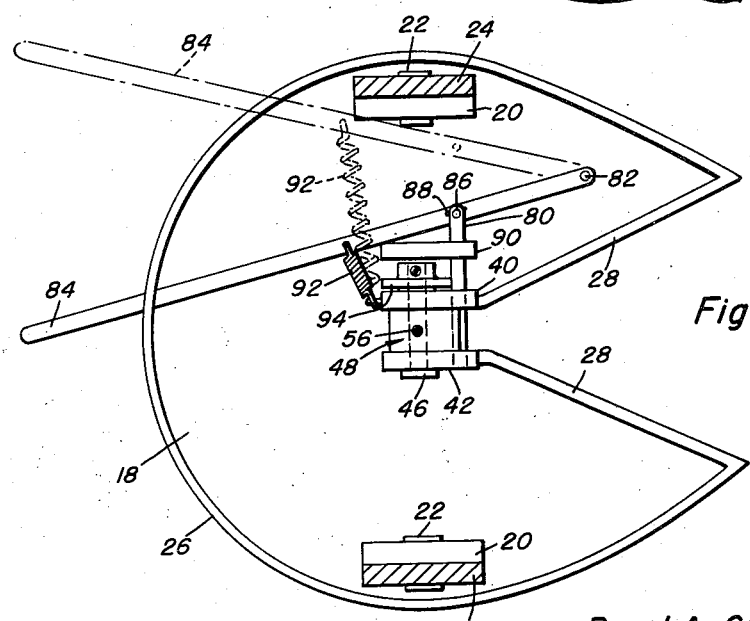
Fig. 3
Fig. 8
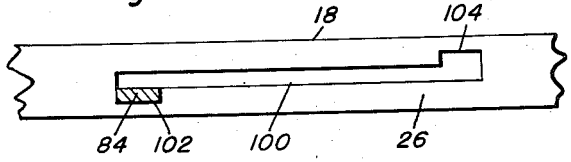
Reuel A. Cochrane
INVENTOR.
BY *Clarence A. O'Brien*
and *Harvey B. Jacobson*
Attorneys May 6, 1958  R. A. COCHRANE  2,833,560
ROCK LOCK TYPE COUPLER FOR TRACTOR-TRAILER
FIFTH WHEEL LOCKING MECHANISM
Filed Dec. 23, 1955  2 Sheets-Sheet 2
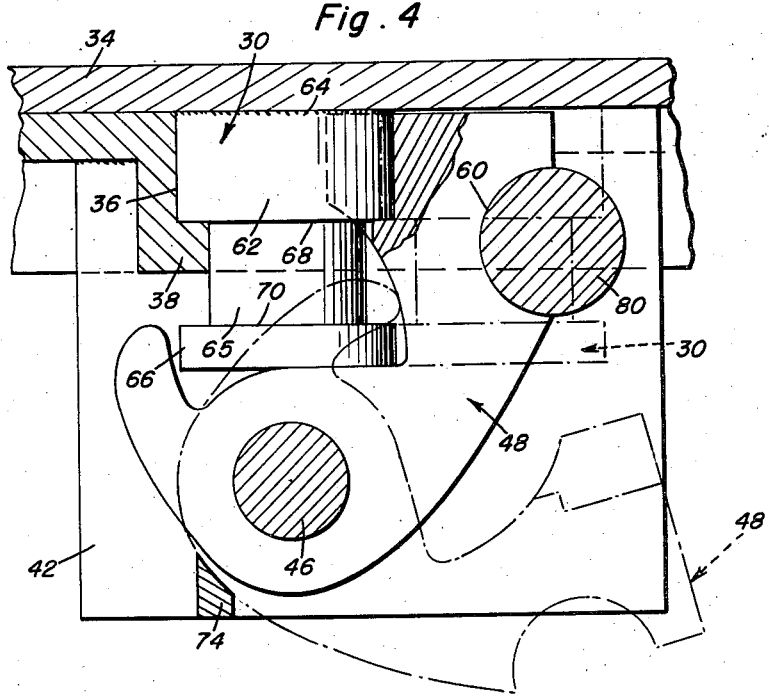
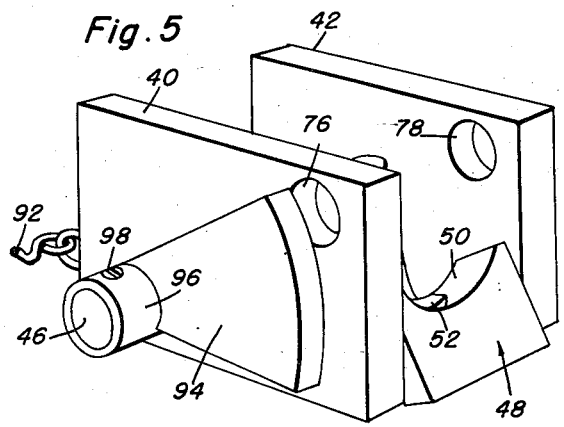
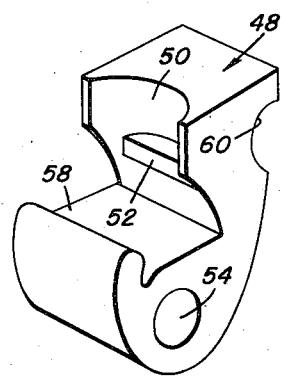
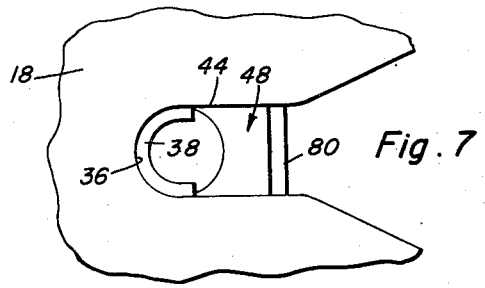
Reuel A. Cochrane
INVENTOR.
BY
Attorneys

United States Patent Office 2,833,560
Patented May 6, 1958

2,833,560
ROCK LOCK TYPE COUPLER FOR TRACTOR-TRAILER FIFTH WHEEL LOCKING MECHANISM

Reuel A. Cochrane, Chilesburg, Va., assignor of fifty percent to The Gamble Company, Inc., Fairmont, Minn., a corporation of Minnesota Application December 23, 1955, Serial No. 555,001

5 Claims. (Cl. 280—437)

This invention relates in general to new and useful improvements in front wheel assemblies, and more specifically to an improved fifth wheel coupler.

In order that trailers may be releasably connected to tractors and at the same time to provide a pivotal connection between the tractor and trailer, there is employed what is commonly called a fifth wheel assembly. Such fifth wheel assembly includes a pin which is normally carried by the trailer and a coupler which is normally carried by the tractor. The pin is normally of circular cross-section with a reduced intermediate portion. The upper portion of the pin engages a guide portion of a fifth wheel plate and there is engaged with the reduced portion of the pin a suitable lock for retaining the pin against movement with respect to the fifth wheel plate. This particular arrangement is not only complicated, but also produces a bending moment in the pin because of the distance between the point of application of force and the connection between the pin and the trailer. Further, because of the reduction in cross-section of the pin, the ultimate strength of the pin is not permitted.

It is therefore the primary object of this invention to provide a fifth wheel coupler which is so constructed whereby when engaged with a pin carried by a trailer will transmit loads between the trailer and the tractor through the upper portion of the pin, which portion is closely adjacent its connection with the trailer and which is of a maximum cross-section whereby a minimum size of pin may be utilized.

Another object of this invention is to provide an improved fifth wheel coupler which includes a lock member mounted for rocking movement, the lock member being extremely strong in construction and easily manufactured whereby the overall cost of the coupler may be reduced from the cost of present day couplers.

Still another object of this invention is to provide an improved fifth wheel coupler which includes a fifth wheel plate having a socket therein for receiving a pin, there being carried by the fifth wheel plate a lock member which is mounted for rocking movement, the lock member cooperating with the seat of the plate to form a socket for receiving and retaining a pin, the lock member receiving direct application of loads between the plate and the pin whereby the connection between the pin and the coupler is of a maximum strength.

A further object of this invention is to provide an improved fifth wheel coupler which includes a fifth wheel plate and a lock member, the lock member being mounted for rocking movement and having a cam surface engageable by a pin whereby the lock member is automatically moved into a pin receiving position in response to the positioning of such a pin.

Still a further object of this invention is to provide an improved fifth wheel coupler of the type which includes a fifth wheel plate, a lock member rockably mounted on the plate for retaining a pin in position relative thereto, and a latch pin aligned with the lock member and restraining the locking of the lock member, the pin being automatically engaged upon movement of the lock member to a coupling pin retaining position.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of the fifth wheel coupler which is the subject of this invention and shows the same mounted on a tractor, only a portion of the tractor being shown;

Figure 2 is a fragmentary side elevational view on an enlarged scale of the coupler and the associated portion of the tractor;

Figure 3 is an enlarged vertical sectional view taken substantially upon the plane indicated by the section line 3—3 of Figure 2 and shows the details of the means for operating the latch member, the means including an operator which is shown in a latch pin retracting position by broken lines;

Figure 4 is an enlarged fragmentary vertical sectional view taken through the center of the coupler and shows engaged with the coupler a coupling pin, the lock member of the coupler being shown in an inoperative position by broken lines;

Figure 5 is an enlarged perspective view of the lock member and the mounting means therefor, there also being illustrated means for preventing the positioning of the latch pin until such time as the lock member is in a coupling pin retaining position;

Figure 6 is an enlarged perspective view of the lock member and shows the specific details thereof;

Figure 7 is a fragmentary top plan view of the fifth wheel plate on an enlarged scale and shows the details of the seat formed therein; and Figure 8 is an enlarged fragmentary side elevational view of the fifth wheel plate and shows the arrangement of retaining means formed therein for the operator, the operator being shown in section.

Referring now to the drawings in detail, it will be seen that there is illustrated in Figure 1 a rear portion of a tractor, which is referred to in general by the reference numeral 10. The tractor 10 includes a frame 12 having mounted on the rear portion thereof a mounting plate 14. Suitably mounted on the mounting plate 14 is the fifth wheel coupler, which is the subject of this invention, the fifth wheel coupler being referred to in general by the reference numeral 16.

The fifth wheel coupler 16 includes a fifth wheel plate 18 of the conventional configuration. The fifth wheel plate 18 is mounted on the mounting plate 14 by means of a pair of depending ears 20 which are disposed on opposite sides of the fifth wheel plate 18 and project downwardly therefrom. The ears 20 are mounted for pivotal movement on transversely aligned pivot pins 22 carried by ears 24 extending upwardly from the mounting plate 14.

The fifth wheel plate 18 is reinforced by a peripheral flange 26 which extends downwardly from the underside thereof. The flange 26 includes forwardly converging portions 28 which function as a guide for a fifth wheel coupling pin, such as the pin 30 illustrated in Figure 4. The rear portions of the plate 18 slope downwardly and rearwardly as at 32 to form suitable ramps for a bottom plate 34 of a trailer.

Referring now to Figures 4 and 7 in particular, it will be seen that the plate 18 is provided with a centrally located seat 36 which opens rearwardly. The seat 36 includes a horizontal shoulder 38 which is generally semi-circular in outline.

Referring now to Figure 5 in particular, it will be seen that there is illustrated a pair of transversely spaced, vertically disposed mounting plates 40 and 42. The mounting plates 40 and 42 may either be cast integral with the fifth wheel plate 18 or welded thereto. The plates 40 and 42 form continuations of the flange portions 28.

As is best illustrated in Figure 7, the fifth wheel plate 18 is provided with a generally rectangular outline opening 44 which is aligned with the seat 36 and which extends rearwardly therefrom. The mounting plates 40 and 42 are disposed on opposite sides of the opening 44 and extend longitudinally from the seat 36. Extending transversely between the mounting plates 40 and 42 is a pivot pin 46. Carried by the pivot pin 46 for rocking movement is a lock member which is referred to in general by the reference numeral 48. The lock member 48 is disposed in alignment with the rectangular opening 44 and is movable therein to cooperate with the seat 36 to retain the coupling 30 in place.

Referring now to Figure 6 in particular, it will be seen that the lock member 48 includes a seat 50 which is complementary to the seat 36. The seat 50 has projecting therefrom a lower shoulder 52 which is aligned with the shoulder 38. In order that the lock member 48 may be mounted on the pivot pin 46, it is provided with a transverse bore 54. The pivot pin 46 passes through the bore 54 and is locked with respect to the lock member 48 by means of a suitable set screw 56, as is best illustrated in Figure 3.

It is pointed out that the opposite sides of the lock member 48 are parallel and that they are spaced apart a distance substantially equal to the width of the opening 44. Further, they are spaced apart a distance substantially equal to the spacing of the mounting plates 40 and 42 so that the lock member 48, when mounted on the pivot pin 46, is limited to rocking movement between the broken line position thereof in Figure 4 and the solid line position thereof in the same figure.

The lower forward portion of the lock member 48 is in the form of a cam 58. The cam 58 is configurated for receiving the lower part of the coupling pin 30 and for automatically rocking the lock member 48 to a coupling pin retaining position. The rear portion of the lock member 48 also includes a recess 60 which is semi-circular in cross-section and which extends transversely of the lock member 48. The recess is aligned generally with the shoulder 52.

Referring once again to Figure 4 in particular, it will be seen that the coupling pin 30 includes an enlarged upper portion 62 which is secured by welding 64 or other fastening means to the underside of the trailer mounting plate 34. The coupling pin 30 also includes a reduced cross-section or intermediate portion 65 and a lower portion 66 which is of the same cross-section as the upper portion 60. Disposed between the intermediate portion 65 and the upper portion 62 is a shoulder 68. A similar shoulder 70 is formed between the intermediate portion 65 and the lower portion 66.

When it is desired to connect a trailer, such as the trailer 72, to the tractor 10, the tractor 10 is backed into alignment with the trailer 72 so that the coupling pin 30 thereof passes between the flange portions 28 and is guided into the opening 44. At this time the lock member 48 is in the broken line position of Figure 4, the last seen position. The lock member 48 is retained in this position by a stop member 44 which extends between the mounting plates 40 and 42. As the tractor 10 moves rearwardly, the cam surface 58 of the lock member 48 strikes the lower portion 66 of the coupling pin 30. The relative movement between the lock member 48 and the coupling pin 30 results in the pivoting of the lock member 48 to the solid line position of Figure 4 as the coupling pin 30 seats in the seat 36. When the lock member 48 is in the solid line position of Figure 4, the seat 50 thereof receives that portion of the coupling 30 opposite the portion received in the seat 36, the seats 36 and 50 cooperating to substantially completely surround the upper portion 62 of the coupling 30. At the same time, the shoulders 38 and 52 engage beneath the shoulder 68 and confine the intermediate portion 64 of the coupling pin 30. The lower portion 66 of the coupling pin 30 is disposed beneath the shoulders 38 and 52 and is restrained against vertical movement with respect thereto. At this point, it is pointed out that the center of the pivot pin 46 is disposed in alignment with the center of the coupling pin 30 so that the relation between the lower portion 66 of the coupling pin 30 and the cam surface 58 remains such that the lock member 48 is pivoted by any relative movement between the coupling pin 30 and the lock member 48.

In order that the lock member 48 may restrain the coupling pin 30 in the socket formed by the seats 36 and 50, there is formed in the mounting plates or members 40 and 42 aligned apertures 76 and 78. Selectively received in the apertures 76 and 78 is a transversely disposed latch pin 80. The latch pin 80 is also received in a recess 60 and prevents rocking of the lock member 48 in a clockwise direction. It is to be noted that the latch pin 80 is disposed in alignment with the coupling pin 30 so that all forces transmitted to the lock member 48 are directly transmitted to the latch pin 80 whereby the only forces involved in the connection between the coupling pin 30 and the coupler 16 are shear.

Referring now to Figure 3 in particular, it will be seen that carried by the underside of the fifth wheel plate 18 and connected thereto by a vertical pivot pin 82 is an operator 84. The operator 84 has an intermediate portion thereof connected to the latch pin 80 by means of a pivot pin 86, the pivot pin 86 passing through an elongated slot 88 in the operator. The latch pin 80 is partially supported by a plate 90 which extends downwardly from the underside of the fifth wheel plate 18 in spaced relation with respect to the mounting plate 40. The latch pin 80 slidably passes through the plate 90.

The operator 84 is normally spring urged to the solid line position of Figure 3 by a spring 92. The spring 92 has one end thereof connected to the operator 84 and the opposite end connected to the mounting plate 40. The spring 92 serves to move the operator 84 to such a position whereby the latch pin 80 is automatically engaged.

In order to prevent engagement of the latch pin except when the lock member 48 is in a coupling pin retaining position such as that of Figure 4, there is carried by the pivot pin 46 for movement therewith a fan-shaped member 94. The fan-shaped member 94 has a hub 96 which is received on the pivot pin 46 and is secured thereto by means of a set screw 98. The fan-shaped member 94 is so connected to the pivot pin 46 with relation to the lock member 48 that in all positions of the lock member 48 with the exception of the solid line position of Figure 4, the fan-shaped member 94 partially overlies the apertures 76 and prevents the entrance of the latch member 80 into the apertures 76.

Referring now to Figure 8 in particular, it will be seen that the reinforcing flange 26 of the fifth wheel plate 18 is provided with an elongated slot 100 in the forward portion thereof. The slot 100 is provided at the forward end thereof with a lower seat 102. A similar, but upper seat 104 is formed at the opposite end of the slot 100. The seats 102 and 104 are of a size to receive the operator 84.

Assuming that the coupler 16 be utilized to couple the trailer 72 to the tractor 10, the operator 84 will be in the position illustrated in Figures 3 and 8. When it is desired to uncouple the trailer 72 from the tractor 10, the driver of the tractor 10 pulls the operator 84 to the dotted line position of Figure 3 at which time it is then seated in the upper seat 104 and retained in place by the tension of the spring 92. This results in the withdrawal of the latch pin 80 and thus permits the lock member 48 free to rock from the solid line position of Figure 4 to the dotted line position thereof. The tractor 10 is then moved forward with respect to the trailer 72 which results in the coupling pin 30 pulling out of the fifth wheel plate 18 and pivoting the lock member 48 to the dotted line position of Figure 4.

When it is desired to couple the tractor to another trailer or the same trailer 72, it is merely necessary for the operator of the tractor 10 to pull the operator 84 down out of the seat 104. There will then be a slight movement of the operator 84 due to the tension of the spring 92. However, the end of the latch pin 80 remote from the operator 84 will strike the fan-shaped member 94 and will be prevented from moving further. The tractor 10 is then backed into engagement with the trailer 72 with the result that the pin 30 will engage the lock member 48 and as it moves into the seat 36 will pivot the lock member 48 up to the solid line position of Figure 4. When the lock member 48 reaches this position, the fan-shaped member 94 will clear the apertures 76 and the latch pin 80 will automatically be moved into a latching position for the lock member 48. It is then only necessary for the operator of the tractor 10 to connect his air lines and electrical line and then drive off with the trailer 72 completely coupled to the tractor 10 in a required manner.

From the foregoing description of the details of the coupler 16, it will be readily apparent that there has not only been provided a simplified coupler, but also one which is of relatively great strength and which has a greater resistance against breakage than existing fifth wheel couplers formed of similar materials.

The foregoing is considered as illustrative only of the principles of the invention. Further, since numerous modifications and changes will readily occur to those skilled in the art, it is not desired to limit the invention to the exact construction and operation shown and described and accordingly, all suitable modifications and equivalents may be resorted to, falling within the scope of the invention as claimed.

What is claimed as new is as follows:

1. A fifth wheel coupling unit comprising a coupling pin and a coupler, said coupling pin including enlarged upper and lower portions connected by a reduced cross section intermediate portion, there being formed by said intermediate portion at the underside of said upper portion a shoulder, said coupler including a fifth wheel plate, a pin receiving slot in said plate, said pin receiving slot terminating in a pin receiving seat, said pin receiving seat including a vertcally extending, semicircular upper portion snugly receiving one half of said upper portion of said pin and a lower semiannular shoulder, said semiannular shoulder engaging said shoulder of said pin and said intermediate portion, a lock member pivotally carried by said fifth wheel plate for rocking movement into and out of cooperating relation with said seat, said lock member including generally a horizontal part and a vertical part, said vertical part having formed therein a socket which includes a vertical arcuate portion opposed to said seat and engaging said upper portion of said pin, a shoulder on said upper part engaging said shoulder of said pin, and a latch member carried by said fifth wheel plate releasably engaged with said lock member to retain said lock member in engagement with said pin.

2. A fifth wheel coupling unit comprising a coupling pin and a coupler, said coupling pin including enlarged upper and lower portions connected by a reduced cross section intermediate portion, there being formed by said intermediate portion at the underside of said upper portion a shoulder, said coupler including a fifth wheel plate, a pin receiving slot in said plate, said pin receiving slot terminating in a pin receiving seat, said pin receiving seat including a vertically extending, semicircular upper portion snugly receiving one half of said upper portion of said pin and a lower semiannular shoulder, said semiannular shoulder engaging said shoulder of said pin and said intermediate portion, a lock member pivotally carried by said fifth wheel plate for rocking movement into and out of cooperating relation with said seat, said lock member including generally a horizontal part and a vertical part, said vertical part having formed therein a socket which includes a vertical arcuate portion opposed to said seat and engaging said upper portion of said pin, said horizontal part including an upper horizontal seat engageable with the lower end of said lower portion of said coupling pin, and a latch member carried by said fifth wheel plate releasably engaged with said lock member for retaining said lock member in a coupling pin engaging position.

3. A fifth wheel coupling unit comprising a coupling pin and a coupler, said coupling pin including enlarged upper and lower portions connected by a reduced cross section intermediate portion, there being formed by said intermediate portion at the underside of said upper portion a shoulder, said coupler including a fifth wheel plate, a pin receiving slot in said plate, said pin receiving slot terminating in a pin receiving seat, said pin receiving seat including a vertically extending, semicircular upper portion snugly receiving one half of said upper portion of said pin and a lower semiannular shoulder, said semiannular shoulder engaging said shoulder of said pin and said intermediate portion, a lock member pivotally carried by said fifth wheel plate for rocking movement into and out of cooperating relation with said seat, said lock member including generally a horizontal part and a vertical part, said vertical part having formed therein a socket which includes a vertical arcuate portion opposed to said seat and engaging said upper portion of said pin, a shoulder on said upper part engaging said shoulder of said pin, and a latch member carried by said fifth wheel plate releasably engaged with said lock member to retain said lock member in engagement with said pin, said lower part of said lock member including a cam shaped upper surface engageable with said lower portion of said coupling pin to urge said lock member from a lowered inoperative position to a raised operative position upon movement of said coupling pin into said seat.

4. The coupling assembly of claim 1 wherein said lock member is mounted on a transverse pivot carried by a pair of plates depending from said fifth wheel plate in transversely spaced parallel relation, said latch member being in the form of a latch pin mounted for sliding movement through said pair of plates, and a fan-shaped guard member carried by said pivot pin for alignment with said latch pin to prevent passage of said latch pin through said pair of plates except when said lock member is in a coupling pin engaging position.

5. The coupling assembly of claim 1 wherein said seat is a fixed and rigid portion of said fifth wheel plate.

References Cited in the file of this patent

UNITED STATES PATENTS

| | | |
|---|---|---|
| 1,933,622 | Fellows | Nov. 7, 1923 |
| 2,431,779 | Stevens | Dec. 2, 1947 |
| 2,610,862 | Braunberger | Sept. 16, 1952 |